US008549117B2

(12) United States Patent
Vogt (10) Patent No.: US 8,549,117 B2
(45) Date of Patent: Oct. 1, 2013

(54) METHOD FOR ADDRESS TRANSLATOR TRAVERSAL IN 3GPP NETWORKS

(75) Inventor: Christian Vogt, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 968 days.

(21) Appl. No.: 12/613,066

(22) Filed: Nov. 5, 2009

(65) Prior Publication Data

US 2011/0106925 A1 May 5, 2011

(51) Int. Cl.
G06F 15/16 (2006.01)
G06F 15/173 (2006.01)
G06F 15/177 (2006.01)

(52) U.S. Cl.
USPC ........... 709/222; 709/220; 709/221; 709/223; 709/227; 709/228

(58) Field of Classification Search
None
See application file for complete search history.

(56) References Cited

U.S. PATENT DOCUMENTS

| 7,554,991 | B2 * | 6/2009 | Sbida | 370/395.5 |
| 7,873,003 | B2 * | 1/2011 | Baek et al. | 370/329 |
| 8,179,888 | B2 * | 5/2012 | Chen et al. | 370/389 |
| 2006/0050667 | A1 * | 3/2006 | Verma et al. | 370/338 |
| 2007/0253359 | A1 * | 11/2007 | Hall et al. | 370/328 |
| 2011/0047256 | A1 * | 2/2011 | Babu et al. | 709/223 |

FOREIGN PATENT DOCUMENTS

| EP | 1926287 A1 | 5/2008 |
| WO | 03052961 A1 | 6/2003 |
| WO | 2009038280 A1 | 3/2009 |

OTHER PUBLICATIONS

"3$^{rd}$ Generation Partnership Project; Technical Specification Group Core Network and Terminals; Mobile Radio Interface Layer 3 Specification; Core Network Protocols; Stage 3 (Release 8)," 3$^{rd}$ Generation Partnership Project (3GPP), Valbonne, France, http://www.3gpp.org, 3GPP TS 24.008 v8.6.0 (Jun. 2009), 2009, 582 pages.
"3$^{rd}$ Generation Partnership Project; Technical Specification Group Core Network and Terminals; General Packet Radio Service (GPRS); GPRS Tunnelling Protocol (GTP) across the Gn and Gp Interface (Release 8)," 3$^{rd}$ Generation Partnership Project (3GPP), Valbonne, France, http://www.3gpp.org, 3GPP TS 29.060 v8.8.0 (Jun. 2009), 2009, 149 pages.

(Continued)

*Primary Examiner* — Thu Nguyen
*Assistant Examiner* — Angela Widhalm
(74) *Attorney, Agent, or Firm* — Blakely Sokoloff Taylor & Zafman LLP (57) ABSTRACT

In response to an ACTIVATE PACKET DATA PROTOCOL (PDP) CONTEXT REQUEST message from a host, including a global reachability request option that requests a global IP address and a global port to be allocated to the host, a serving gateway transmits a CREATE PDP CONTEXT REQUEST message to an Internet gateway device. The CREATE PDP CONTEXT REQUEST message includes the global reachability request option. In response to a CREATE PDP CONTEXT RESPONSE message from the Internet gateway, where the CREATE PDP CONTEXT RESPONSE message includes a global reachability response option specifying therein a global IP address and a global port allocated to the host, the serving gateway transmits an ACTIVATE PDP CONTEXT ACCEPT message to the host, where the ACTIVATE PDP CONTEXT ACCEPT message includes the global reachability response option. As a result, the host does not need to establish a separate connection session to the Internet gateway device to acquire the same.

20 Claims, 7 Drawing Sheets

(56) References Cited

OTHER PUBLICATIONS

Maennel, Olaf et al. "A Better Approach than Carrier-Grade-NAT" Columbia University, New York, Technical Report CUCS-041-08, Sep. 2008, 6 pages.

Rosenberg, J. "Interactive Connectivity Establishment (ICE): A Protocol for Network Address Translator (NAT) Traversal for Offer/Answer Protocols draft-ietf-mmusic-ice-19," MMUSIC, Internet-Draft, Intended Status: Standards Track, Oct. 29, 2007, 110 pages.

Huston, Geoff "IPv4 Address Report," www.potaroo.net, Oct. 16, 2009, 43 pages.

Rosenberg, J. et al. "Session Traversal Utilities for NAT (STUN)," Network Working Group, Request for Comments: 5389, Oct. 2008, 52 pages.

Rosenberg, J. et al. "Traversal Using Relays around NAT (TURN): Relay Extensions to Session Traversal Utilities for NAT (STUN) draft-ietf-behave-turn-16," BEHAVE WG, Internet-Draft, Intended Status: Standards Track, Jul. 3, 2009, 82 pages.

International Search Report and Written Opinion, Application No. PCT/IB2010/054854, dated Feb. 10, 2011, 16 pages.

3rd Generation Partnership Project; Technical Specification Group Services and System Aspects; General Packet Radio Service (GPRS); Service description; Stage 2 (Release 9), Sep. 2009, 290 pages, V9.2.0, 3GPP Organizational Partners.

3rd Generation Partnership Project; Technical Specification Group Core Network and Terminals; Mobile radio interface Layer 3 specification; Core network protocols; Stage 3 (Release 9), Sep. 2009, 591 pages, V9.0.0, 3GPP Organizational Partners.

3rd Generation Partnership Project; Technical Specification Group Core Network and Terminals; General Packet Radio Service (GPRS); GPRS Tunnelling Protocol (GTP) across the Gn and Gp interface (Release 9), Sep. 2009, 149 pages, V9.0.0, 3GPP Organizational Partners.

\* cited by examiner

METHOD FOR ADDRESS TRANSLATOR TRAVERSAL IN 3GPP NETWORKS

FIELD OF THE INVENTION

Embodiments of the invention relate generally to the field of network computing; and more particularly, to network address translator traversal.

BACKGROUND

Network operators frequently apply address translation to separate the local Internet protocol (IP) addresses they use inside their networks from the global IP addresses at which the networks are reachable from an external network such as the Internet. One of the various purposes is to keep their local IP address structure independent of the provider assigning their global IP addresses, to conceal their internal network topology from the rest of the Internet for security reasons, or to conserve global IP addresses by sharing a single global IP address among multiple local addresses. In particular, the latter purpose is of growing importance, where the imminent run-out of unallocated global IP version 4 (IPv4) address puts a pressure on network operators to use these addresses economically.

In order to accomplish the purposes identified above, address translators perform two functions. First, they rewrite addresses in packets en route, swapping local IP addresses with the corresponding global IP addresses or vice versa. This enables provider independent and network topology concealment. Second, address translators multiplex multiple local addresses onto a single global address. This enables conservation of global addresses. To enable de-multiplexing of packets received at a shared global address back onto the right local address, address translators store address mappings as connection-specific disambiguation state, and they use the connection initiator's port number in received packets as indexes into this state. To ensure uniqueness of this port number across all connections handled by an address translator, the port number may have to be translated. The mapping between the resulting local and global port numbers is then stored as a part of the corresponding disambiguation state.

Address translation requires awareness in applications that expect to be contacted by remote peers. Such applications must refer their peers to a combination of global address and global port number at which they are reachable by those peers, since in the presence of an address translator, their local address and global port number may be unreachable by the peers. The applications must hence have a means through which they can discover a global address and global port number. This is commonly referred to as address translator traversal. Conventional systems for address translator traversal require applications to inquire of infrastructure what a packet's source address and global port number look like after translation.

The conventional address translator traversal methods cause extra signaling, which may reduce the effective network bandwidth; reduce uptime of battery-powered hosts; and increase application start-up latencies. This signaling overhead can be large because: (a) it must be done for every application, and (b) it not only occurs during the beginning of a communication session, but also periodically for refresh purposes. The existing address translator traversal methods typically exchange multiple message pairs in order to determine the type of address translator through which they are reachable. The address translator traversal is typically performed by individual applications even if multiple applications reside on the same host.

SUMMARY OF THE DESCRIPTION

Techniques for performing a network address translator traversal for a host of a third generation partnership project (3GPP) network to acquire a global Internet protocol (IP) address and a global port using existing 3GPP protocols are described herein. According to one aspect of the invention, in response to an ACTIVATE PACKET DATA PROTOCOL (PDP) CONTEXT REQUEST message from a host, including a global reachability request option that requests a global IP address and a global port to be allocated to the host, a serving gateway transmits a CREATE PDP CONTEXT REQUEST message to an Internet gateway device. The CREATE PDP CONTEXT REQUEST message includes the global reachability request option. In response to a CREATE PDP CONTEXT RESPONSE message from the Internet gateway, where the CREATE PDP CONTEXT RESPONSE message includes a global reachability response option specifying therein a global IP address and a global port allocated to the host, the serving gateway transmits an ACTIVATE PDP CONTEXT ACCEPT message to the host, where the ACTIVATE PDP CONTEXT ACCEPT message includes the global reachability response option. As a result, the host does not need to establish a separate connection session to the Internet gateway device to acquire the same.

According to another aspect of the invention, a serving gateway device receives a MODIFY PACKET DATA PROTOCOL (PDP) CONTEXT REQUEST message from a host, where the MODIFY PDP CONTEXT REQUEST message includes a global reachability extension request option that requests an additional global port to be allocated to the host. In response to the MODIFY PDP CONTEXT REQUEST message, the serving gateway transmits an UPDATE PDP CONTEXT REQUEST message to the Internet gateway device, where the UPDATE PDP CONTEXT REQUEST message includes the global reachability extension request option from the MODIFY PDP CONTEXT REQUEST message. Subsequently, the serving gateway receives an UPDATE PDP CONTEXT RESPONSE message from the Internet gateway, where the UPDATE PDP CONTEXT RESPONSE message includes a global reachability extension response option specifying therein an additional global port allocated to the host. In response to the UPDATE PDP CONTEXT RESPONSE message, a MODIFY PDP CONTEXT ACCEPT message is transmitted from the serving gateway device to the host, where the MODIFY PDP CONTEXT ACCEPT message includes the global reachability extension response option from the UPDATE PDP CONTEXT RESPONSE message. As a result, the host does not need to establish a separate connection session to the Internet gateway device in order to acquire an additional global port to be associated with the host.

According to another aspect of the invention, a serving gateway device receives a MODIFY PDP CONTEXT REQUEST message from a host, where the MODIFY PDP CONTEXT REQUEST message includes a global reachability deallocation request option that requests deallocation of a global port associated with the host. In response to the MODIFY PDP CONTEXT REQUEST message, a UPDATE PDP CONTEXT REQUEST message is transmitted from the serving gateway device to the Internet gateway device, where the UPDATE PDP CONTEXT REQUEST message includes the global reachability deallocation request option from the MODIFY PDP CONTEXT REQUEST message. Subsequently, the serving gateway receives a UPDATE PDP CONTEXT RESPONSE message from the Internet gateway, where the UPDATE PDP CONTEXT RESPONSE message includes a global reachability deallocation response option indicating a status of the deallocation of the global port. In response to the UPDATE PDP CONTEXT RESPONSE message, a MODIFY PDP CONTEXT ACCEPT message is transmitted from the serving gateway device to the host, where the MODIFY PDP CONTEXT ACCEPT message includes the global reachability deallocation response option from the UPDATE PDP CONTEXT RESPONSE message. As a result, the host does not need to establish a separate connection session to the Internet gateway device in order to deallocate a global port associated with the host.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

According to some embodiments of the invention, a mechanism is provided to mitigate certain problems described above. Like existing methods for address translator traversal, embodiments of the invention enable applications to discover a global IP address (also simply referred to as a global address) and a global port number (also simply referred to as a global port) through which they can be reached from remote peers. As mentioned above, the signaling overhead of the conventional address translator traversal can be relatively large because: (a) it must be done for every application, and (b) it not only occurs during the beginning of a communication session, but also periodically for refresh purposes. The embodiments of the invention reduce the above signaling overhead because it piggybacks onto an existing protocol, i.e., the PDP context establishment and modification protocol. Specifically, embodiments of the invention utilize a piggyback technique to the packet data protocol (PDP) context activation procedure and/or PDP context modification procedure, which third generation partnership project (3GPP) networks require to enable a host for IP-based communications. Thus, embodiments of the invention reduce the extra signaling of dedicated address translator traversal.

According to one embodiment, the PDP context activation procedure is augmented to set up the IP connectivity for hosts, with address translator traversal functionality. Similar to existing methods for address translator traversal, embodiments of the invention enable applications to establish a global reachability in the presence of address translators. According to one embodiment, the address translator traversal is performed as a part of a host's network attachment procedure rather than during an application startup. The results may be subsequently made available by a host to one or more interested applications (e.g., applications running within the host). According to one embodiment, a host can discover a range of global port numbers in combination with their global address rather than only a single global port number. This is necessary because the results of address translator traversal are for use by multiple applications instead of a single application.

Embodiments of the invention extend the PDP context activation and modification procedures with one or more new message options. The new message options enable a host to indicate the 3GPP network to either inform the host that address translation is not used, or to push the requested information to the host. The new message options may be implemented as new information elements (e.g., a designated option or options) or as new parameters for an existing option such as a protocol configuration option defined in the 3GPP specification.

The PDP context activation procedure is a two-way handshake process between a host and the Internet gateway that connects a 3GPP network to the Internet. The handshake is carried out via the host's current serving gateway, which serves as a relay between the host and the Internet gateway. An Internet gateway is also referred to as a gateway general packet radio service (GPRS) support node (GGSN) and a serving gateway is also referred to as serving GPRS support node (SGSN).

Figure 1:
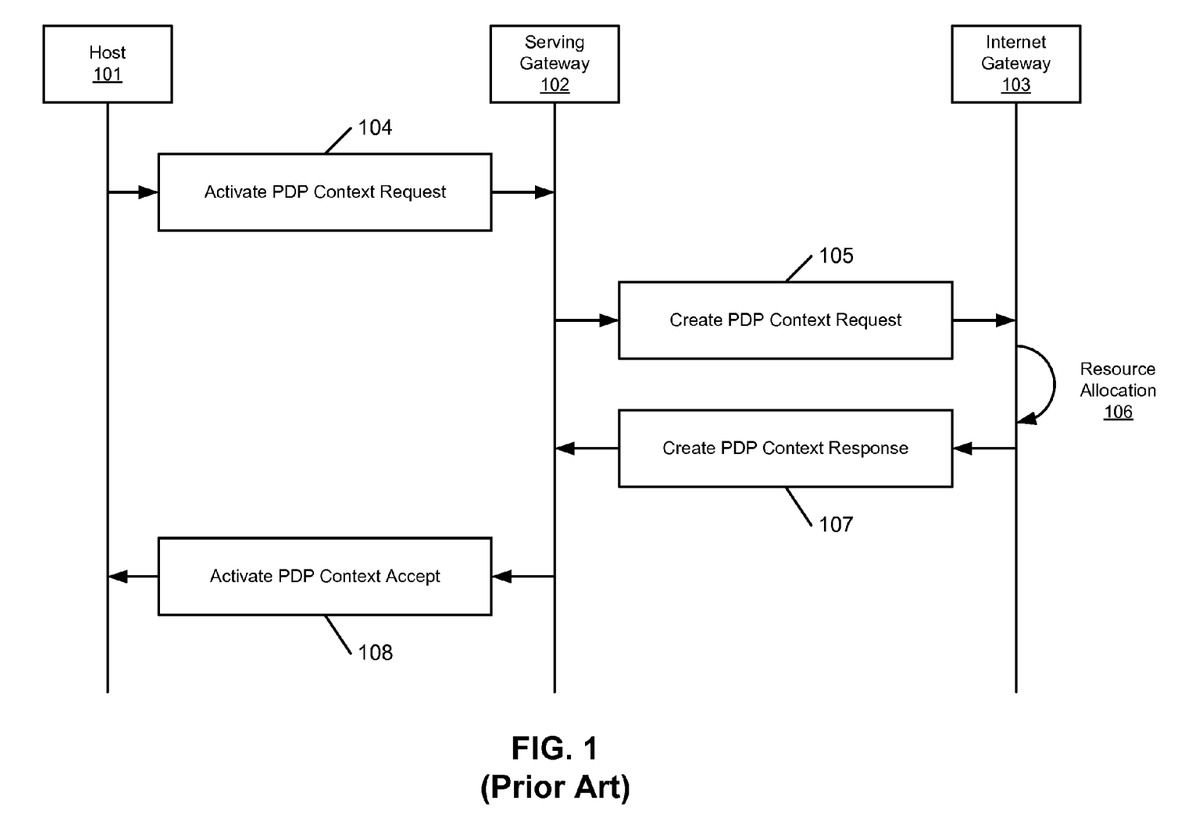
FIG. 1 is a transactional diagram illustrating a typical PDP context activation process of 3GPP networks.

FIG. 1 is a transactional diagram illustrating a typical PDP context activation process of 3GPP networks. Referring to FIG. 1, when a host 101 attached to a 3GPP network desires to set up IP connectivity, host 101 sends, via transaction 104, an Active PDP Context Request message to a serving gateway 102 associated with the host 101. The Activate PDP Context Request message may include options with parameters requested by host 101. After authentication, the serving gateway 102 generates a Create PDP Context Request message based on the parameters from the Activate PDP Context Request message. The Create PDP Context Request message is then transmitted from serving gateway 102 to an Internet gateway 103 associated with the serving gateway 102 via transaction 105.

The Internet gateway 103 approves, modifies, or declines the parameters requested by the host 101 and allocates resources accordingly at operations 106. The Internet gateway 103 then sends, via transaction 107, a Create PDP Context Response message to the serving gateway 102. The parameters granted to the host 101 may be included in the Create PDP Context Response message as an option. The serving gateway 102 relays, via transaction 108, to host 101 in a form of an Activate PDP Context Accept message.

Further detailed information concerning the transactions as shown in FIG. 1 can be found in the 3GPP specification such as 3GPP Technical Specification 29.060, June 2009, entitled "$3^{rd}$ Generation Partnership Project; Technical Specification Group Core Network and Terminals; General Packet Radio Service (GPRS); GPRS Tunneling Protocol (GTP) Across the Gn and Gp Interface (Release 8)" and 3GPP Technical Specification 24.008, June 2009, entitled "$3^{rd}$ Generation Partnership Project; Technical Specification Group Core Network and Terminals; Mobile Radio Interface layer 3 Specification; Core Network Protocols; Stage 3 (Release 8)." The disclosure of the above identified 3GPP specifications are incorporated by reference herein it its entirety.

According to some embodiments of the invention, new options are defined and utilized in the messages exchanged during the PDP context activation procedure described above. In one embodiment, a Global Reachability Information Request option is introduced to indicate a host's interest in a global IP address and a global port (e.g., a global transport control protocol or TCP port) number range. A Global Reachability Information Response option is introduced to return such information back to the host. According to one embodiment, the Global Reachability Information Request option may be used in the Activate PDP Context Request and Create PDP Context Request messages described above. Similarly, the Global Reachability Information Response option may be used in the Create PDP Context Response and Activate PDP Context Accept messages described above.

Figure 2:
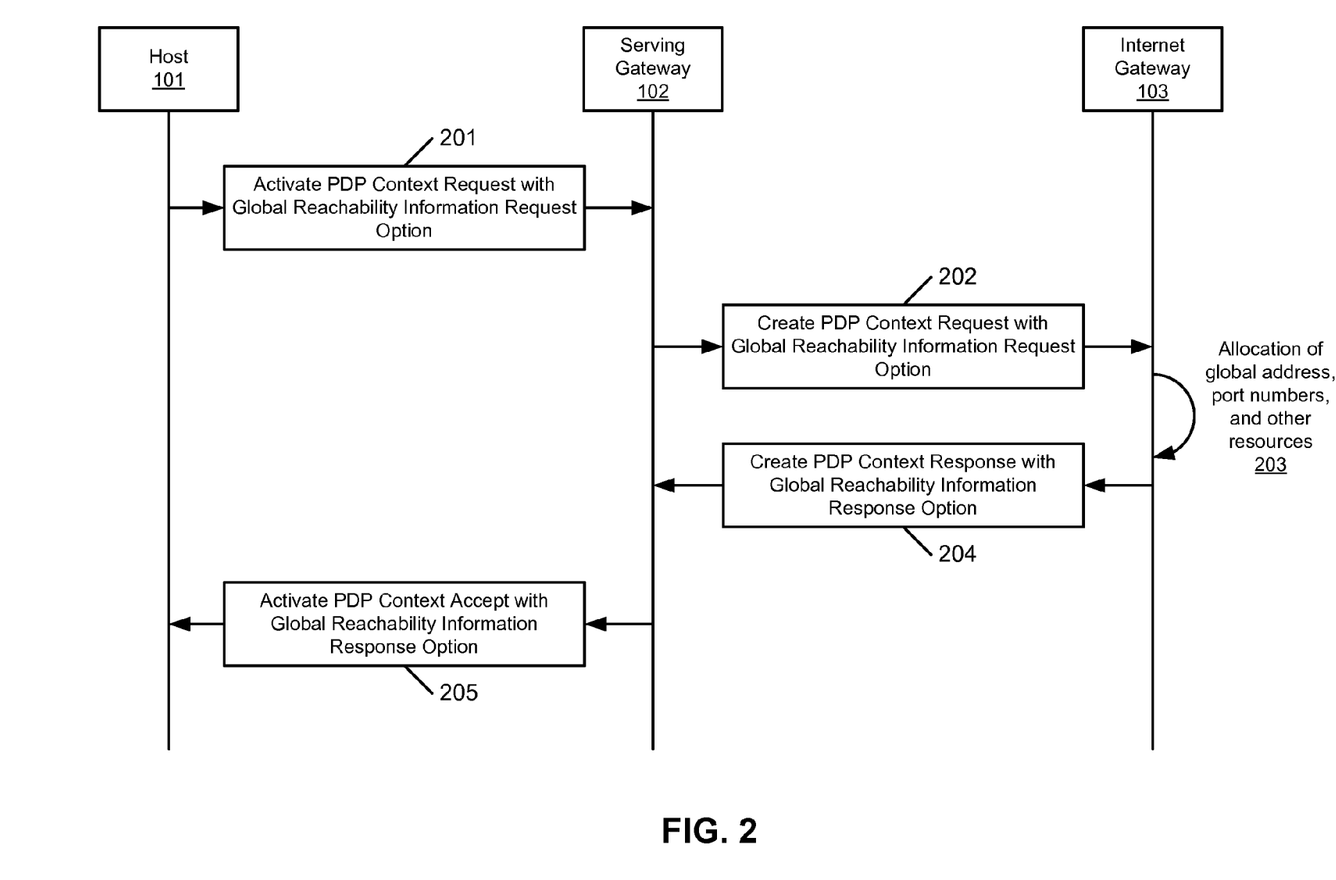
FIG. 2 is a transactional diagram illustrating a method for discovering a global IP address and global port during a PDP context activation process of 3GPP networks according to one embodiment of the invention.

FIG. 2 is a transactional diagram illustrating a method for discovering a global IP address and global port during a PDP context activation process of 3GPP networks according to one embodiment of the invention. Referring to FIG. 2, when a host 101 attached to a 3GPP network desires to set up IP connectivity, host 101 sends, via transaction 201, an Active PDP Context Request message to a serving gateway 102 associated with the host 101. The Activate PDP Context Request message may include options with parameters requested by host 101. In one embodiment, the Activate PDP Context Request message includes a Global Reachability Information Request option indicating an interest of host 101 to obtain a global address and global port or a range of global port numbers associated with host 101.

After authentication, the serving gateway 102 generates a Create PDP Context Request message based on the parameters from the Activate PDP Context Request message. In one embodiment, the Create PDP Context Request message includes the Global Reachability Information Request option extracted from the Activate PDP Context Request message. The Create PDP Context Request message is then transmitted from serving gateway 102 to an Internet gateway 103 associated with the serving gateway 102 via transaction 202.

The Internet gateway 103 approves, modifies, or declines the parameters requested by the host 101 and allocates resources accordingly at operations 203. In addition, the Internet gateway 103 further allocates a global IP address and a list of global ports (e.g., a range of global port numbers) for host 101. The Internet gateway 103 then sends, via transaction 204, a Create PDP Context Response message to the serving gateway 102. The parameters granted to the host 101 may be included in the Create PDP Context Response message as an option. In addition, according to one embodiment, the Create PDP Context Response message includes a Global Reachability Information Response option including the global address and global ports allocated to host 101. If the corresponding 3GPP network does not use address translation, according to one embodiment, the global address returned in the Global Reachability Information Response option equals to a local address of host 101 and the global port number range includes the full set of global port numbers.

The serving gateway 102 relays, via transaction 205, to host 101 in a form of an Activate PDP Context Accept message. Host 101 further provides an interface (e.g., application programming interface or API) to one or more applications hosted by host 101 to discover the global address and global port number range obtained from the Internet gateway 103, and through which they can reserve and deallocate global ports as needed.

Figure 3:
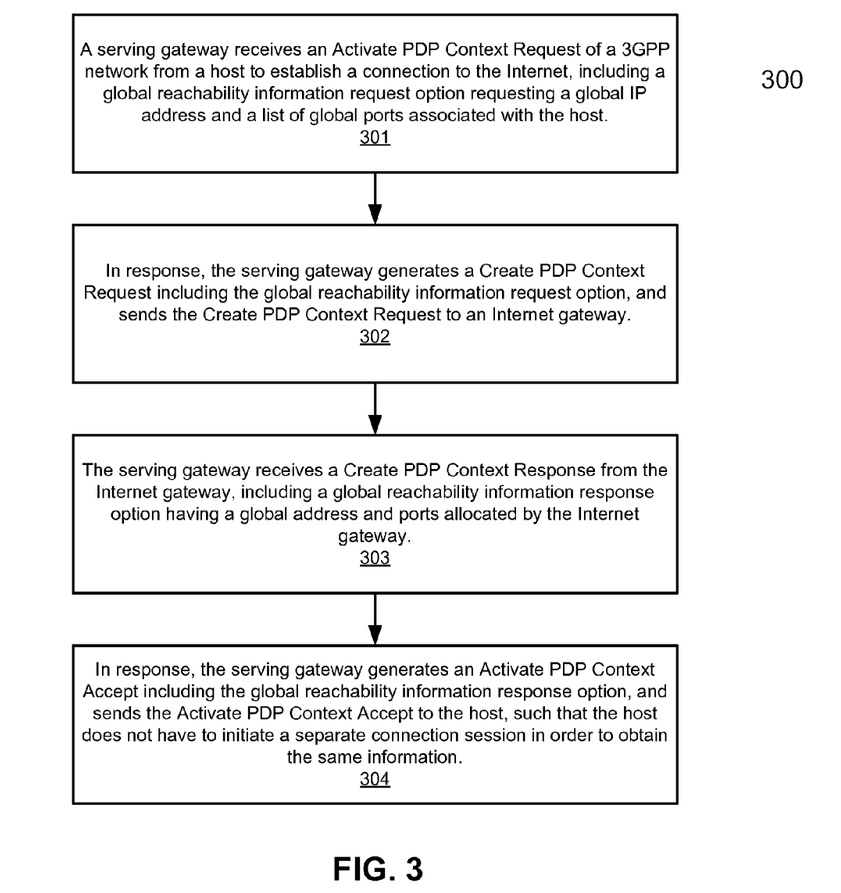
FIG. 3 is a flow diagram illustrating a method for requesting global reachability information via a PDP context activation procedure according to one embodiment of the invention.

FIG. 3 is a flow diagram illustrating a method for requesting global reachability information via a PDP context activation procedure according to one embodiment of the invention. Note that method 300 may be performed by processing logic which may include software, firmware, hardware, or a combination thereof. For example, method 300 may be performed by a serving gateway such as serving gateway 102 of FIG. 2. Referring to FIG. 3, at block 301, a serving gateway receives an Activate PDP Context Request of a 3GPP network from a host to establish a connection to the Internet. The Activate PDP Context Request includes a Global Reachability Information Request option that requests a global IP address and one or more global ports (e.g., a range of global port numbers) associated with the host.

In response to the Activate PDP Context Request, at block 302, the serving gateway generates a Create PDP Context Request including the Global Reachability Information Request from the Activate PDP Context Request, and sends the Create PDP Context Request to an Internet gateway associated with the serving gateway. At block 303, the serving gateway receives a Create PDP Context Response from the Internet gateway, including a Global Reachability Information Response option having a global address and one or more ports allocated by the Internet gateway. At block 304, the serving gateway generates an Activate PDP Context Accept including the Global Reachability Information Response option from the Create PDP Context Response, and sends the Activate PDP Context Accept to the host. As a result, the host does not have to initiate a separate connection session in order to obtain the same information. Specifically, the host does not need to pursue additional address translator traversal signaling transactions with the serving gateway and/or Internet gateway.

The number of global ports assigned to a host is at the discretion of the Internet gateway. Since the Internet gateway can at best use heuristics to estimate the number of global ports that a host may require, a host may at times require more global ports than it was assigned by the Internet gateway during the initial PDP context activation procedure. Likewise, a host may have been assigned more global ports than it actually needs. According to certain embodiments, a PDP context modification procedure defined by the above 3GPP specifications is extended to enable both the assignment of an additional global port to a host, and the deallocation of an unused global port from the host.

The PDP context modification procedure is used in the 3GPP networks to change certain parameters negotiated during the initial PDP context activation procedure Like PDP context activation, PDP context modification is a two-way handshake between a host and the Internet gateway, enabling the same use of option pairs for negotiation between the host and the Internet gateway. According to one embodiment, two additional options are introduced to be used with the PDP context modification procedure. First, a pair of Global Reachability Extension Request option and Global Reachability Extension Response option is defined to enable, respectively, a host to request an additional global port, and an Internet gateway to return the additional global port if possible. Second, a pair of Global Reachability Deallocation Request option and a Global Reachability Deallocation Response option is defined to enable, respectively, a host to return an unused global port, and the Internet gateway to confirm the deallocation of the unused port to the host.

Figure 4:
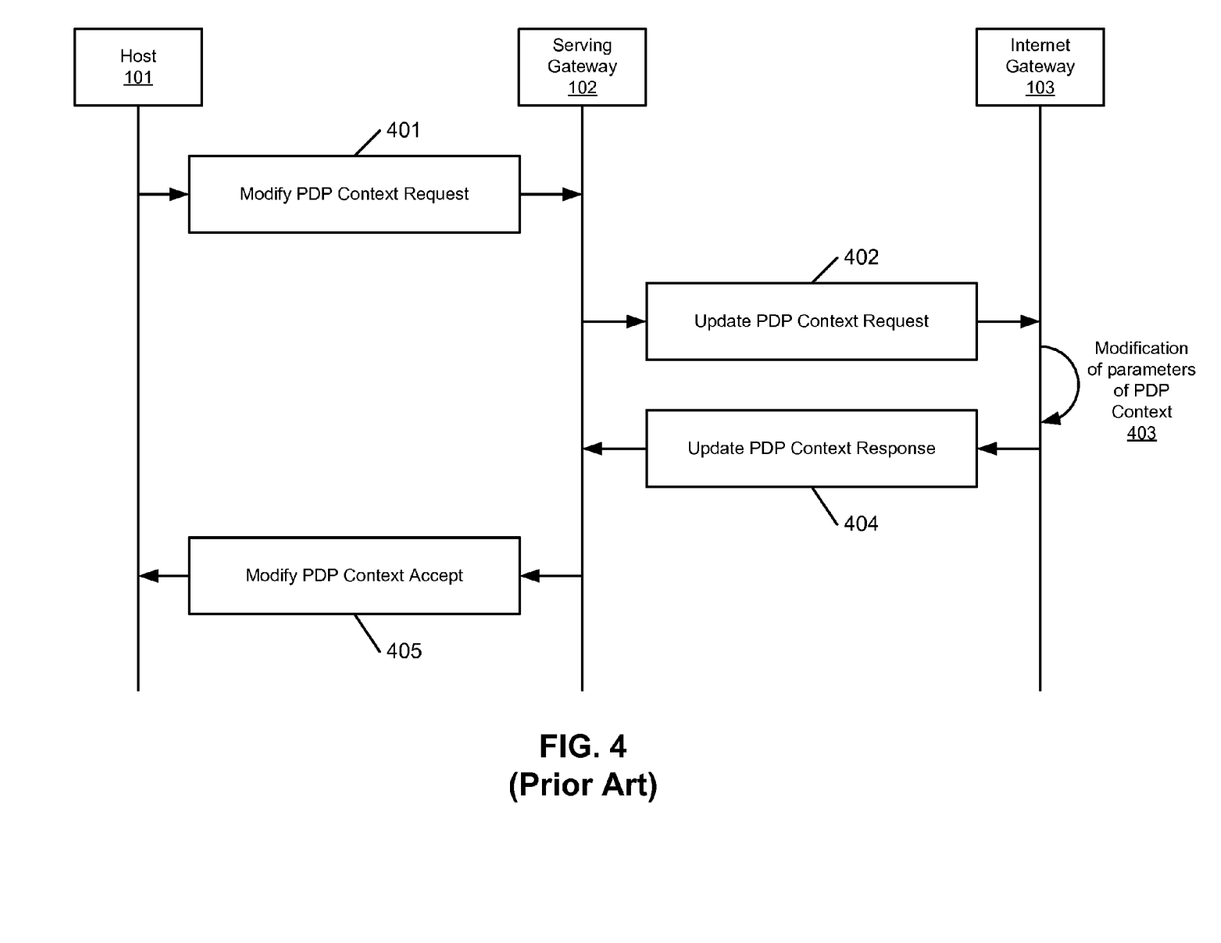
FIG. 4 is a transactional diagram illustrating a typical PDP context modification procedure of a 3GPP network.

FIG. 4 is a transactional diagram illustrating a typical PDP context modification procedure. The PDP context modification procedure is used to modify certain parameters of a particular PDP context. Referring to FIG. 4, at transaction 401, host 101 sends a Modify PDP Context Request message to serving gateway 102. Serving gateway 102 in turn generates and sends an Update PDP Context Request message to the Internet gateway 103 via transaction 402. In response, at transaction 403, Internet gateway 103 modifies certain parameters of the current PDP context based on the Update PDP Context Request. The Internet gateway 103 returns an Update PDP Context Response message to serving gateway 102 via transaction 404, and the serving gateway 102 returns a Modify PDP Context Accept message back to host 101 at transaction 405. The above messages are defined in the aforementioned 3GPP specifications.

Figure 5:
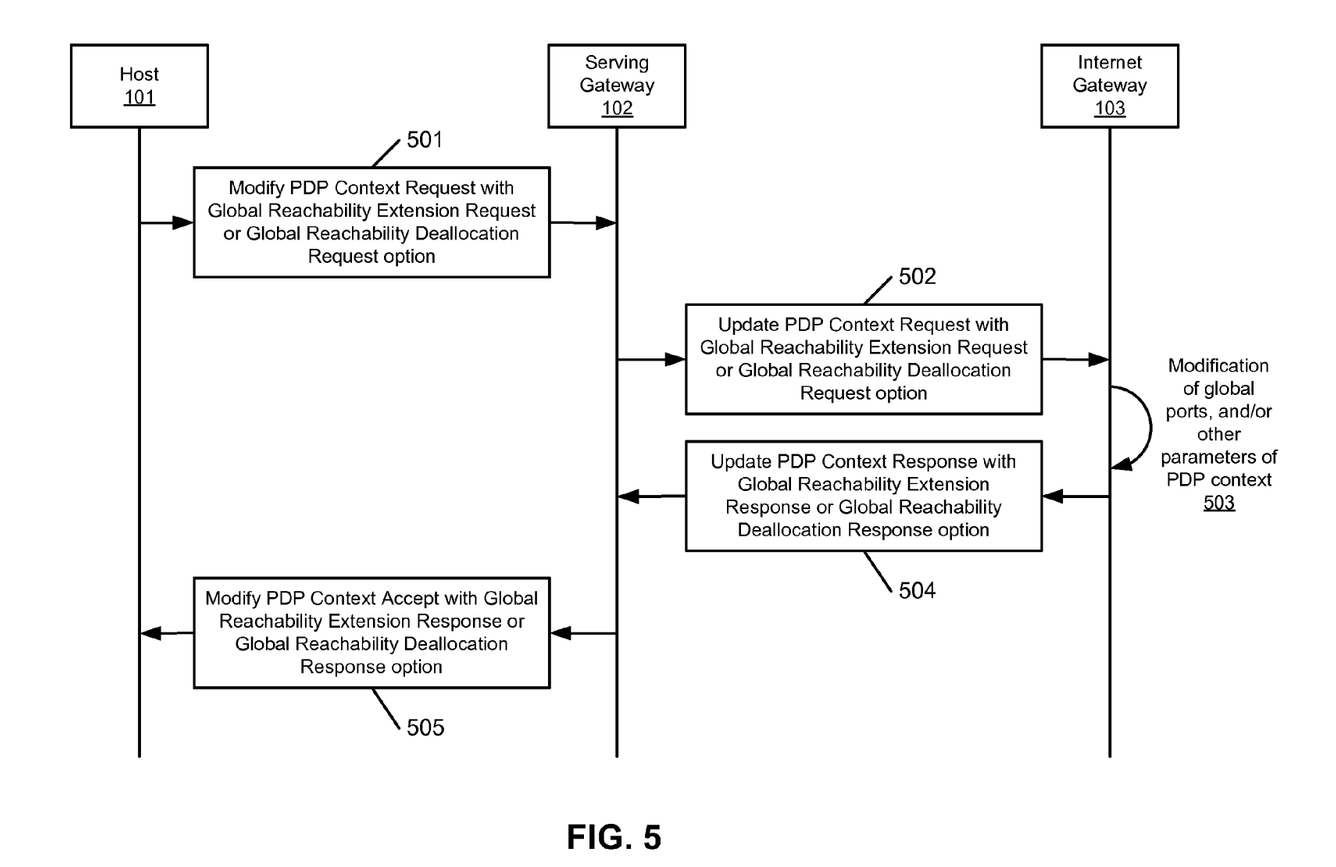
FIG. 5 is a transactional diagram illustrating an extended PDP context modification procedure according to one embodiment.

FIG. 5 is a transactional diagram illustrating an extended PDP context modification procedure according to one embodiment. In addition to the standard PDP context modification procedure, which is used to modify certain parameters of a particular PDP context, the standard PDP context modification procedure is extended to carry additional information for the purposes of allocating additional global port or deallocating a global port. Referring to FIG. 5, at transaction 501, host 101 sends a Modify PDP Context Request message to serving gateway 102. In addition to standard information of the Modify PDP Context Request as defined by the 3GPP specification, the Modify PDP Context Request further includes a Global Reachability Extension Request option or a Global Reachability Deallocation Request option. The Global Reachability Extension Request option or a Global Reachability Deallocation Request option may be implemented as a specific or designated option of the Modify PDP Context Request. Alternatively, the Global Reachability Extension Request option or a Global Reachability Deallocation Request option may be implemented as a part of a Protocol Configuration option defined the aforementioned 3GPP specification.

Serving gateway 102 in turn generates and sends an Update PDP Context Request message to the Internet gateway 103 via transaction 502. The Update PDP Context Request message includes the Global Reachability Extension Request option or a Global Reachability Deallocation Request option from the Modify PDP Context Request message. In response, at transaction 503, Internet gateway 103 modifies certain parameters of the current PDP context based on the Update PDP Context Request. In addition, the Internet gateway 103 also perform allocation or deallocation of a global port based on the Global Reachability Extension Request option or a Global Reachability Deallocation Request option of the Update PDP Context Request. The Internet gateway 103 returns an Update PDP Context Response message to serving gateway 102 via transaction 504, including the additional global port allocated or a status confirming the deallocation of a global port. The serving gateway 102 returns a Modify PDP Context Accept message back to host 101 at transaction 505, including the additional global port allocated or a status confirming the deallocation of a global port from the Update PDP Context Response message.

Figure 6:
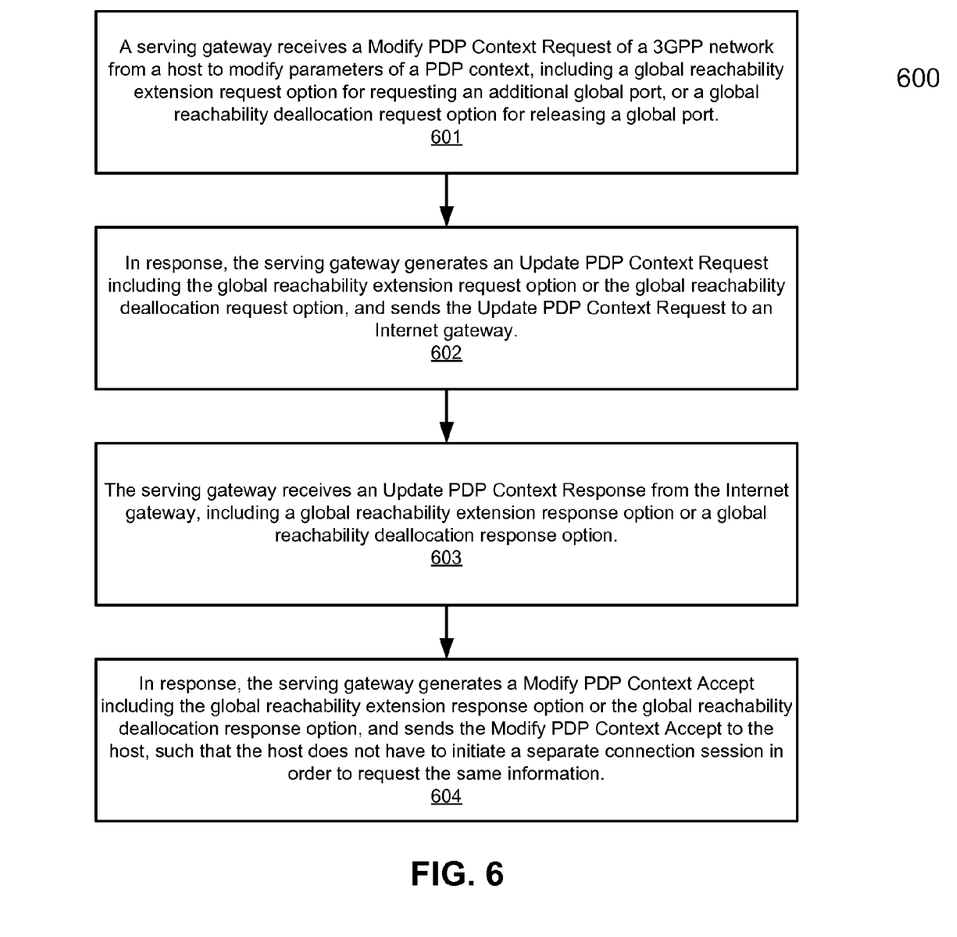
FIG. 6 is a flow diagram illustrating a method for performing an extended PDP context modification procedure according to one embodiment.

FIG. 6 is a flow diagram illustrating a method for performing an extended PDP context modification procedure according to one embodiment. Note that method 600 may be performed by processing logic which may include software, firmware, hardware, or a combination thereof. For example, method 600 may be performed by a serving gateway such as serving gateway 102 of FIG. 2. Referring to FIG. 6, at block 601, a serving gateway receives a Modify PDP Context Request of a 3GPP network from a host to modify one or more parameters of a PDP context. The Modify PDP Context Request includes a Global Reachability Extension Request option for requesting an additional global port to be allocated to the host, or a Global Reachability Deallocation Request option for deallocating a particular global port that has been previously allocated to the host.

In response, at block 602, the serving gateway generates an Update PDP Context Request including the Global Reachability Extension Request option or the Global Reachability Deallocation Request option from the Modify PDP Context Request, and the serving gateway sends the Update PDP Context Request to an Internet gateway. At block 603, the serving gateway receives an Update PDP Context Response from the Internet gateway. The Update PDP Context Response includes a Global Reachability Extension Response option or a Global Reachability Deallocation Response option. In response, at block 604, the serving gateway generates a Modify PDP Context Accept including the Global Reachability Extension Response option or the Global Reachability Deallocation Response option from the Update PDP Context Response. The serving gateway then sends the Modify PDP Context Accept back to the host. As a result, the host does not have to initiate a separate connection session in order to request the same information. Specifically, the host does not need to pursue additional address translator traversal signaling transactions with the serving gateway and/or Internet gateway.

Figure 7:
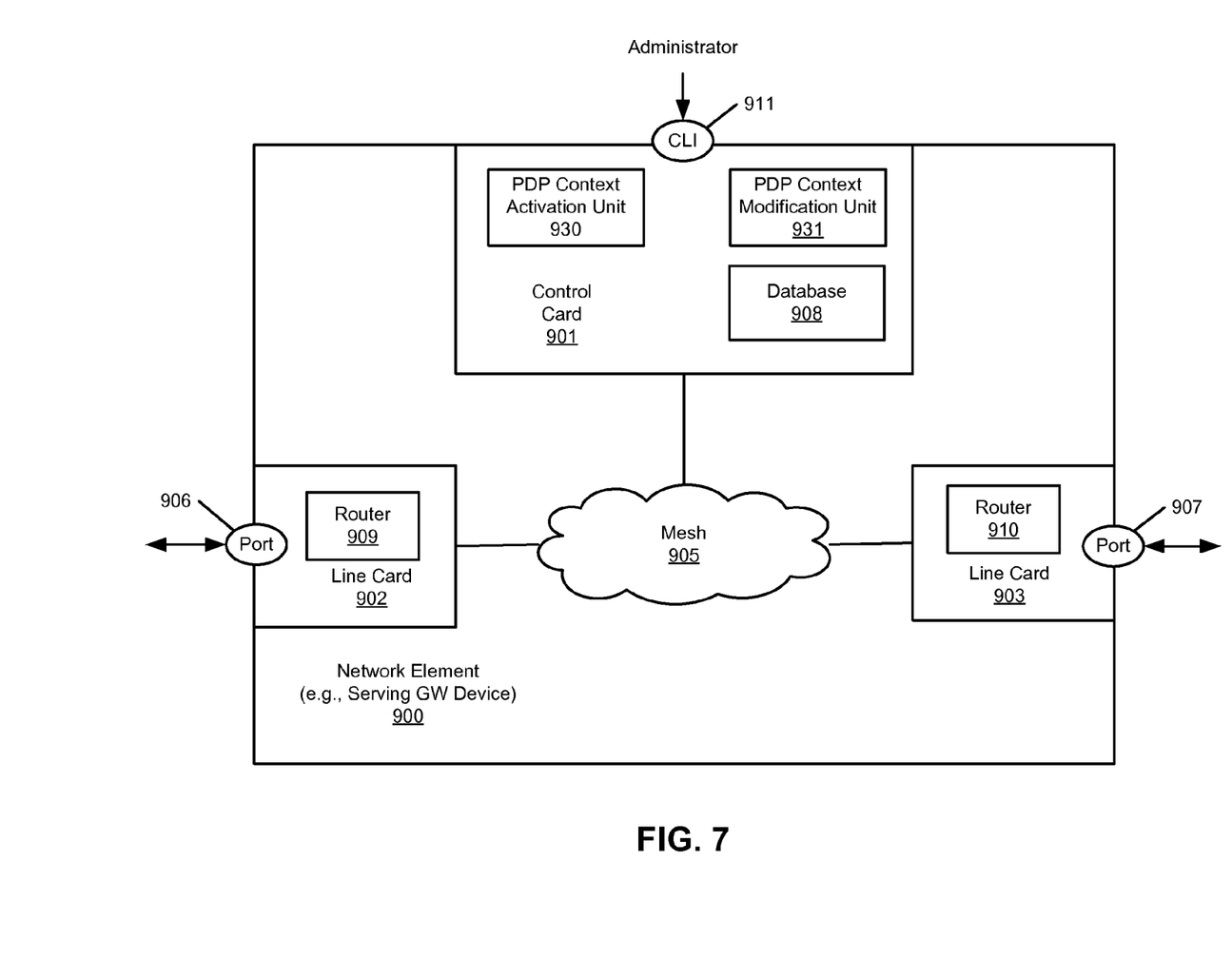
FIG. 7 is a block diagram illustrating a network element according to one embodiment of the invention.

FIG. 7 is a block diagram illustrating a network element according to one embodiment of the invention. Network element 900 may be implemented as any one of network nodes as shown in FIG. 2. For example, network element 900 may be implemented as a part of serving gateway 102 of FIG. 2. Referring to FIG. 7, network element 900 includes, but is not limited to, a control card 901 (also referred to as a control plane) communicatively coupled to one or more line cards 902-903 (also referred to as interface cards or user planes) over a mesh 905, which may be a mesh network, an interconnect, a bus, or a combination thereof. A line card is also referred to as a data plane (sometimes referred to as a forwarding plane or a media plane). Each of the line cards 902-903 is associated with one or more interfaces (also referred to as ports), such as interfaces 906-907 respectively. Each line card includes routing functional block or logic (e.g., blocks 909-910) to route and/or forward packets via the corresponding interface according to a configuration (e.g., routing table) configured by control card 901, which may be configured by an administrator via an interface 911 (e.g., a command line interface or CLI).

According to one embodiment, control card 901 includes, but is not limited to, a PDP context activation unit 930, a PDP context modification unit 931, and a database 908. The PDP context activation unit 930 is configured to perform the extended PDP context activation procedure including handling global reachability information requests as described above. The PDP context modification unit 931 is configured to perform the extended PDP context modification procedure including modifying global reachability information as described above.

Referring back to FIG. 7, in the case that the network element 900 is a router (or is implementing routing functionality), the control plane 901 typically determines how data (e.g., packets) is to be routed (e.g., the next hop for the data and the outgoing port for that data), and the data plane (e.g., lines cards 902-903) is in charge of forwarding that data. For example, the control plane 901 typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS), etc.), Label Distribution Protocol (LDP), Resource Reservation Protocol (RSVP), etc.) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures, etc.) on the control plane (e.g., database 908). The control plane 901 programs the data plane (e.g., line cards 902-903) with information (e.g., adjacency and route information) based on the routing structure(s). For example, the control plane 901 programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main routing information base (RIB) based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network element 900 can store one or more bridging tables that are used to forward data based on the layer 2 information in this data.

For the purpose of illustration only, only one control card and two line cards are shown in FIG. 7. Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway), etc.). By way of example, a service card may be used to terminate IPsec tunnels and execute the attendant authentication and encryption algorithms. As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video).

Subscriber end stations (e.g., servers, workstations, laptops, palm tops, mobile phones, smart phones, multimedia phones, Voice Over Internet Protocol (VOIP) phones, portable media players, global positioning system (GPS) units, gaming systems, set-top boxes, etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public Web pages (free content, store fronts, search services, etc.), private Web pages (e.g., username/password accessed Web pages providing email services, etc.), corporate networks over VPNs, etc. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Note that network element 900 is described for the purpose of illustration only. More or fewer components may be implemented dependent upon a specific application. For example, although a single control card is shown, multiple control cards may be implemented, for example, for the purpose of redundancy. Similarly, multiple line cards may also be implemented on each of the ingress and egress interfaces. Also note that some or all of the components as shown in FIG. 7 may be implemented in hardware, software, or a combination of both.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method for performing a network address translator traversal for a host of a third generation partnership project (3GPP) network to acquire a global Internet protocol (IP) address and a global port using existing 3GPP protocols, the method comprising the steps of:
receiving, at a serving gateway device, an ACTIVATE PACKET DATA PROTOCOL (PDP) CONTEXT REQUEST message from a host, the ACTIVATE PDP CONTEXT REQUEST message being compatible with 3GPP network protocols, wherein the ACTIVATE PDP CONTEXT REQUEST message includes a global reachability request option that requests a global IP address and a global port to be allocated to the host;
in response to the ACTIVATE PDP CONTEXT REQUEST message, transmitting a CREATE PDP CONTEXT REQUEST message from the serving gateway device to an Internet gateway device, the CREATE PDP CONTEXT REQUEST message including the global reachability request option from the ACTIVATE PDP CONTEXT REQUEST message, wherein the CREATE PDP CONTEXT REQUEST message is compatible with the 3GPP network protocols;
receiving, at the serving gateway device, a CREATE PDP CONTEXT RESPONSE message from the Internet gateway, the CREATE PDP CONTEXT RESPONSE message being compatible with the 3GPP network protocols, wherein the CREATE PDP CONTEXT RESPONSE message includes a global reachability response option specifying therein a global IP address and a plurality of global ports allocated to the host; and
in response to the CREATE PDP CONTEXT RESPONSE message, transmitting an ACTIVATE PDP CONTEXT ACCEPT message from the serving gateway device to the host, the ACTIVATE PDP CONTEXT ACCEPT message including the global reachability response option that specifies the global IP address and the plurality of global ports, wherein the plurality of global ports are used by a plurality of applications of the host without each of the plurality of applications reserving a separate port with the serving gateway device, wherein the ACTIVATE PDP CONTEXT ACCEPT message is compatible with the 3GPP network protocols.

2. The method of claim 1, wherein the global reachability request option is a designated option listed in the ACTIVATE PDP CONTEXT REQUEST message and the CREATE PDP CONTEXT REQUEST message.

3. The method of claim 2, wherein the global reachability response option is a designated option listed in the CREATE PDP CONTEXT RESPONSE message and the ACTIVATE PDP CONTEXT ACCEPT message.

4. The method of claim 1, wherein the global reachability request option is specified in a PROTOCOL CONFIGURATION option defined in the ACTIVATE PDP CONTEXT REQUEST message and the CREATE PDP CONTEXT REQUEST message.

5. The method of claim 4, wherein the global reachability response option is specified in a PROTOCOL CONFIGURATION option defined in the CREATE PDP CONTEXT RESPONSE message and the ACTIVATE PDP CONTEXT ACCEPT message.

6. The method of claim 1, further comprising the steps of:
receiving, at the serving gateway device, a MODIFY PDP CONTEXT REQUEST message from a host, wherein the MODIFY PDP CONTEXT REQUEST message includes a global reachability extension request option that requests an additional global port to be allocated to the host;
in response to the MODIFY PDP CONTEXT REQUEST message, transmitting an UPDATE PDP CONTEXT REQUEST message from the serving gateway device to the Internet gateway device, the UPDATE PDP CONTEXT REQUEST message including the global reachability extension request option from the MODIFY PDP CONTEXT REQUEST message;
receiving, at the serving gateway device, an UPDATE PDP CONTEXT RESPONSE message from the Internet gateway, wherein the UPDATE PDP CONTEXT RESPONSE message includes a global reachability extension response option specifying therein an additional global port allocated to the host; and
in response to the UPDATE PDP CONTEXT RESPONSE message, transmitting a MODIFY PDP CONTEXT ACCEPT message from the serving gateway device to the host, the MODIFY PDP CONTEXT ACCEPT message including the global reachability extension response option from the UPDATE PDP CONTEXT RESPONSE message, whereby the host does not need to establish a separate connection session to the Internet gateway device in order to acquire an additional global port associated with the host.

7. The method of claim 6, wherein the global reachability extension request option is one of a designated option and a PROTOCOL CONFIGURATION option defined in the MODIFY PDP CONTEXT REQUEST message and the UPDATE PDP CONTEXT REQUEST message.

8. The method of claim 7, wherein the global reachability response option is one of a designated option and a PROTOCOL CONFIGURATION option defined in the UPDATE PDP CONTEXT RESPONSE message and the MODIFY PDP CONTEXT ACCEPT message.

9. The method of claim 1, further comprising the steps of:
receiving, at the serving gateway device, a second MODIFY PDP CONTEXT REQUEST message from a host, wherein the second MODIFY PDP CONTEXT REQUEST message includes a global reachability deallocation request option that requests deallocation of a global port associated with the host;
in response to the second MODIFY PDP CONTEXT REQUEST message, transmitting a second UPDATE PDP CONTEXT REQUEST message from the serving gateway device to the Internet gateway device, the second UPDATE PDP CONTEXT REQUEST message including the global reachability deallocation request option from the second MODIFY PDP CONTEXT REQUEST message;
receiving, at the serving gateway device, a second UPDATE PDP CONTEXT RESPONSE message from the Internet gateway, wherein the second UPDATE PDP CONTEXT RESPONSE message includes a global reachability deallocation response option indicating a status of the deallocation of the global port; and
in response to the second UPDATE PDP CONTEXT RESPONSE message, transmitting a second MODIFY PDP CONTEXT ACCEPT message from the serving gateway device to the host, the second MODIFY PDP CONTEXT ACCEPT message including the global reachability deallocation response option from the second UPDATE PDP CONTEXT RESPONSE message,
whereby the host does not need to establish a separate connection session to the Internet gateway device in order to deallocate a global port associated with the host.

10. The method of claim 9, wherein the global reachability deallocation request option is one of a designated option and a PROTOCOL CONFIGURATION option defined in the second MODIFY PDP CONTEXT REQUEST message and the second UPDATE PDP CONTEXT REQUEST message.

11. The method of claim 10, wherein the global reachability deallocation response option is one of a designated option and a PROTOCOL CONFIGURATION option defined in the second UPDATE PDP CONTEXT RESPONSE message and the second MODIFY PDP CONTEXT ACCEPT message.

12. A network element to operate as a serving gateway device to enable a network address translator traversal for a host of a third generation partnership project (3GPP) network to acquire a global Internet protocol (IP) address and a global port using existing 3GPP protocols, the network element comprising:
a packet data protocol (PDP) context activation unit, the PDP context activation unit including,
a first receiver adapted to receive an ACTIVATE PDP CONTEXT REQUEST message from a host, the ACTIVATE PDP CONTEXT REQUEST message being compatible with 3GPP network protocols, wherein the ACTIVATE PDP CONTEXT REQUEST message includes a global reachability request option that requests a global IP address and a global port to be allocated to the host, and
a first transmitter, in response to the ACTIVATE PDP CONTEXT REQUEST message, adapted to transmit a CREATE PDP CONTEXT REQUEST message to an Internet gateway device, the CREATE PDP CONTEXT REQUEST message including the global reachability request option the ACTIVATE PDP CONTEXT REQUEST message, wherein the CREATE PDP CONTEXT REQUEST message is compatible with the 3GPP network protocols,
wherein the first receiver is adapted to receive a CREATE PDP CONTEXT RESPONSE message from the Internet gateway, the CREATE PDP CONTEXT RESPONSE message being compatible with the 3GPP network protocols, wherein the CREATE PDP CONTEXT RESPONSE message includes a global reachability response option specifying therein a global IP address and a plurality of global ports allocated to the host, and
wherein in response to the CREATE PDP CONTEXT RESPONSE message, the first transmitter is adapted to transmit an ACTIVATE PDP CONTEXT ACCEPT message to the host, the ACTIVATE PDP CONTEXT ACCEPT message including the global reachability response option that specifies the global IP address and the plurality of global ports, wherein the plurality of global ports are used by a plurality of applications of the host without each of the plurality of applications reserving a separate port with the serving gateway device, wherein the ACTIVATE PDP CONTEXT ACCEPT message is compatible with the 3GPP network protocols.

13. The network element of claim 12, further comprising a PDP context modification unit, the PDP context modification unit including,
a second receiver adapted to receive a MODIFY PDP CONTEXT REQUEST message from a host, wherein the MODIFY PDP CONTEXT REQUEST message includes a global reachability extension request option that requests an additional global port to be allocated to the host, and
a second transmitter, in response to the MODIFY PDP CONTEXT REQUEST message, adapted to transmit an UPDATE PDP CONTEXT REQUEST message to the Internet gateway device, the UPDATE PDP CONTEXT REQUEST message including the global reachability extension request option from the MODIFY PDP CONTEXT REQUEST message,
wherein the second receiver is adapted to receive an UPDATE PDP CONTEXT RESPONSE message from the Internet gateway, wherein the UPDATE PDP CONTEXT RESPONSE message includes a global reachability extension response option specifying therein an additional global port allocated to the host,
wherein in response to the UPDATE PDP CONTEXT RESPONSE message, the second transmitter is adapted to transmit a MODIFY PDP CONTEXT ACCEPT message to the host, the MODIFY PDP CONTEXT ACCEPT message including the global reachability extension response option from the UPDATE PDP CONTEXT RESPONSE message, and whereby the host does not need to establish a separate connection session to the Internet gateway device in order to acquire an additional global port associated with the host.

14. The network element of claim 13, wherein the PDP context modification unit further comprises:

a third receiver to receive a second MODIFY PDP CONTEXT REQUEST message from a host, wherein the second MODIFY PDP CONTEXT REQUEST message includes a global reachability deallocation request option that requests deallocation of a global port associated with the host, and a third transmitter, in response to the second MODIFY PDP CONTEXT REQUEST message, adapted to transmit a second UPDATE PDP CONTEXT REQUEST message to the Internet gateway device, the second UPDATE PDP CONTEXT REQUEST message including the global reachability deallocation request option the second MODIFY PDP CONTEXT REQUEST message, wherein the third receiver is adapted to receive a second UPDATE PDP CONTEXT RESPONSE message from the Internet gateway, wherein the second UPDATE PDP CONTEXT RESPONSE message includes a global reachability deallocation response option indicating a status of the deallocation of the global port, and wherein in response to the second UPDATE PDP CONTEXT RESPONSE message, the third transmitter is adapted to transmit a second MODIFY PDP CONTEXT ACCEPT message to the host, the second MODIFY PDP CONTEXT ACCEPT message including the global reachability deallocation response option from the second UPDATE PDP CONTEXT RESPONSE message, and whereby the host does not need to establish a separate connection session to the Internet gateway device in order to deallocate a global port associated with the host.

15. A machine-implemented method for performing a network address translator traversal for a host of a third generation partnership project (3GPP) network to acquire a global Internet protocol (IP) address and a global port using existing 3GPP protocols, the method comprising the steps of:

receiving, at a serving gateway device, a MODIFY PACKET DATA PROTOCOL (PDP) CONTEXT REQUEST message from a host, wherein the MODIFY PDP CONTEXT REQUEST message includes a global reachability extension request option that requests an additional global port to be allocated to the host;

in response to the MODIFY PDP CONTEXT REQUEST message, transmitting an UPDATE PDP CONTEXT REQUEST message from the serving gateway device to the Internet gateway device, the UPDATE PDP CONTEXT REQUEST message including the global reachability extension request option from the MODIFY PDP CONTEXT REQUEST message;

receiving, at the serving gateway device, an UPDATE PDP CONTEXT RESPONSE message from the Internet gateway, wherein the UPDATE PDP CONTEXT RESPONSE message includes a global reachability extension response option specifying therein an additional global port allocated to the host, wherein the additional global port is used by an application of the host without the application reserving a port with the serving gateway device; and in response to the UPDATE PDP CONTEXT RESPONSE message, transmitting a MODIFY PDP CONTEXT ACCEPT message from the serving gateway device to the host, the MODIFY PDP CONTEXT ACCEPT message including the global reachability extension response option from the UPDATE PDP CONTEXT RESPONSE message.

16. The method of claim 15, wherein the global reachability extension request option is one of a designated option and a PROTOCOL CONFIGURATION option defined in the MODIFY PDP CONTEXT REQUEST message and the UPDATE PDP CONTEXT REQUEST message.

17. The method of claim 16, wherein the global reachability response option is one of a designated option and a PROTOCOL CONFIGURATION option defined in the UPDATE PDP CONTEXT RESPONSE message and the MODIFY PDP CONTEXT ACCEPT message.

18. A machine-implemented method for performing a network address translator traversal for a host of a third generation partnership project (3GPP) network to acquire a global Internet protocol (IP) address and a global port using existing 3GPP protocols, the method comprising the steps of:

receiving, at the serving gateway device, a MODIFY PDP CONTEXT REQUEST message from a host, wherein the MODIFY PDP CONTEXT REQUEST message includes a global reachability deallocation request option that requests deallocation of a global port associated with the host;

in response to the MODIFY PDP CONTEXT REQUEST message, transmitting a UPDATE PDP CONTEXT REQUEST message from the serving gateway device to the Internet gateway device, the UPDATE PDP CONTEXT REQUEST message including the global reachability deallocation request option from the MODIFY PDP CONTEXT REQUEST message;

receiving, at the serving gateway device, a UPDATE PDP CONTEXT RESPONSE message from the Internet gateway, wherein the UPDATE PDP CONTEXT RESPONSE message includes a global reachability deallocation response option indicating a status of the deallocation of the global port; and in response to the UPDATE PDP CONTEXT RESPONSE message, transmitting a MODIFY PDP CONTEXT ACCEPT message from the serving gateway device to the host, the MODIFY PDP CONTEXT ACCEPT message including the global reachability deallocation response option from the UPDATE PDP CONTEXT RESPONSE message, whereby the host does not need to establish a separate connection session to the Internet gateway device in order to deallocate a global port associated with the host.

19. The method of claim 18, wherein the global reachability deallocation request option is one of a designated option and a PROTOCOL CONFIGURATION option defined in the MODIFY PDP CONTEXT REQUEST message and the UPDATE PDP CONTEXT REQUEST message.

20. The method of claim 19, wherein the global reachability deallocation response option is one of a designated option and a PROTOCOL CONFIGURATION option defined in the UPDATE PDP CONTEXT RESPONSE message and the MODIFY PDP CONTEXT ACCEPT message.

* * * * *